US00RE35168E

United States Patent [19]

Golpe

[11] E Patent Number: Re. 35,168

[45] Reissued Date of Patent: Mar. 5, 1996

[54] VEHICLE SUSPENSION ASSEMBLY

[75] Inventor: William Golpe, San Bernardino, Calif.

[73] Assignee: Monroe Auto Equipment Company, Monroe, Mich.

[21] Appl. No.: 66,503

[22] Filed: May 24, 1993

Related U.S. Patent Documents

Reissue of:

[64] Patent No.: 4,943,081
Issued: Jul. 24, 1990
Appl. No.: 309,460
Filed: Feb. 10, 1989

[51] Int. Cl.[6] ..... B60G 3/00

[52] U.S. Cl. ..... 280/666; 280/670; 280/696; 280/701; 280/725

[58] Field of Search ..... 280/660, 663, 280/666, 667, 670, 696, 701, 725, 726, 96.1

[56] References Cited

U.S. PATENT DOCUMENTS

| | | | |
|---|---|---|---|
| 3,331,615 | 7/1967 | Quartier | 280/666 |
| 4,083,575 | 4/1978 | Smith et al. | 280/696 |
| 4,271,922 | 6/1981 | Kishline | 280/666 |
| 4,869,527 | 9/1989 | Coddens | 280/663 |

OTHER PUBLICATIONS

Sieman, Rick: "Big Oly Rides Again", *Off-Road Magazine,* Oct. 1987, pp. 70–76.
Staff of Off-Road: "Big Oly II—Under Construction", *Off-Road Magazine,* Nov. 1987, pp. 70–77.
Staff of Off-Road: "Big Oly II—Heavy Work On Our Heavy Metal Truck", *Off-Road Magazine,* Dec. 1987, pp. 74–83.
Staff of Off-Road: "Big Oly II—Serious Progress", *Off-Road Magazine,* Jan. 1988, pp. 74–87.
Sieman, Rick: "Before You Win, You've Got To Finish", *Off-Road Magazine,* Feb. 1988, pp. 50–57.
Sieman, Rick: "Wrapping Up Big Oly", *Off-Road Magazine,* Mar. 1988, pp. 76–83.
Sieman, Rick: "Dust, Dents and Traffic Jams", *Off-Road Magazine,* Jun. 1988, pp. 78–82.

*Primary Examiner*—Margaret A. Focarino
*Assistant Examiner*—Paul N. Dickson
*Attorney, Agent, or Firm*—Harness, Dickey & Pierce

[57] ABSTRACT

A suspension assembly for a wheel of a motor vehicle, includes a suspension assembly, an axle beam, an elongated spring, and a radius arm. The radius arm has an extended length for attachment at a mid-region suspension connection point on the vehicle frame. The suspension bracket has multiple surfaces adapted for flush mounting to the chassis of the vehicle.

1 Claim, 3 Drawing Sheets

VEHICLE SUSPENSION ASSEMBLY

Matter enclosed in heavy brackets [ ] appears in the original patent but forms no part of this reissue specification; matter printed in italics indicates the additions made by reissue.

BACKGROUND OF THE INVENTION

The present invention relates to wheel suspension assemblies for vehicles, and more particularly, to a suspension assembly which limits torquing stresses caused by the vertical and rotational movement of the axle beam against the suspension bracket on the vehicle chassis as the wheel moves vertically or rotationally.

Vehicles for off road driving generally have a chassis, which includes a pair of spaced apart longitudinal chassis members, a center cross member, transversely interconnected between the longitudinal chassis members at a point near their mid regions, and a suspension cross member between the longitudinal chassis members near an end of the longitudinal chassis members. The longitudinal chassis members each have a front end which curves upwardly to extend over the vehicle's axles and various other suspension members. Each of the longitudinal chassis members has a suspension connection location for each wheel suspension, a spring attachment adjacent to the wheel and the radius arm attachment rearward of the wheel. Conventionally, two wheel suspension assemblies are mounted at the front of the vehicle, one on each side. Each has an axle beam extending across the front of the vehicle with an outboard end on which a spindle is attached for rotationally mounting a wheel, and an inboard end coupled to a suspension cross member at a predefined downwardly projection location. The suspension assembly also includes a radius arm having a forward end coupled adjacent to the outboard end of the axle beam, and a rear end pivotally mounted to a chassis suspension connection location.

As the vehicle as driven over bumps and holes in the road, the wheel moves vertically forcing the axle beam to pivot about a primary axis on the axle beam and forcing the rear end of the radius arm to pivot about a second axis generally perpendicular to the primary axis. This movement of the radius arm maintains the spindle end of the axle beam at a fixed distance from both the suspension connection location and the predefined downwardly projecting location on the suspension cross member. Thus, the spindle end of the axle beam will move along an [accurate] *arcuate* path as the radius arm and axle beam pivot about their connection points on the longitudinal chassis member and suspension cross member, respectively. However, pivotal movement of the axle beam as the spingle rotates through the arc results in torquing of the axle beam at the point the axle beam is pivotally attached to the suspension cross member, bending of the radius arm at the point the radius arm is attached to the longitudinal chassis member, and transmission of this bending movement into the longitudinal chassis member. This movement further results in the application of shear stresses to the entire suspension assembly. Conventionally, the radius arm is attached to the longitudinal chassis member at a location near the wheel and spindle, where the longitudinal chassis member has been bent upwardly to project and extend over the components of the suspension assembly. However, connection of the radius arm on this raised, near position of the longitudinal chassis member has been found to cause extreme torquing and shearing stresses to be exerted against the suspension bracket and the suspension cross member, and through the radius arm against the longitudinal chassis member. Such extreme stresses have been found to cause failure of the suspension bracket and stress fractures in the suspension cross member, the axle beam, the longitudinal chassis member, and the radius arm. Such structural failures can cause the vehicle to become highly unstable and dangerous to operate.

Further, torquing of the axle beam against the suspension bracket and radius arm against the longitudinal chassis member causes a binding effect on the wheel as it travels vertically in response to road hazards. This decreases the reaction time of the wheel, that is, the time it takes the wheel to recover after encountering a road hazard and resume its normal position, resulting in a rougher "ride." This binding also causes a springing action resulting in increased "wheel rate" also referred to as an increased side frequency.

Additionally, the movement of the wheel about an arcuate path as the radius arm pivots about its pivotal connection point to the longitudinal chassis member causes the caster angle to change, resulting in changes in vehicle response and control.

Consequently, there is a need for an improved suspension assembly for off-road vehicles which will allow large vertical movement of the wheel without exerting excessive stresses against the various suspension assembly members, minimizing undesirable vibration and providing a smoother, more comfortable and softer ride.

The present invention solves these problems by providing a suspension assembly for each of one or more wheels, where the radius arm has been lengthened to interconnect to the longitudinal chassis member at a lower location proximate to the center cross member which is rearward of the upward bend of the longitudinal chassis member which extends over the other members of the suspension assembly. The new connection point is therefore below the previous connection point for the radius arm and along the longitudinal chassis member so that forces transferred through the radius arm to the longitudinal chassis member are primarily longitudinally, rather than transversely, transferred thereby greatly reducing the shear stress component of the force. Furthermore, by lengthening the radius arm, the angle of rotation of the axle beam is greatly reduced, causing the torquing of the axle beam against the suspension bracket, axle beam itself, suspension cross member, radius arm, radius arm bracket, and longitudinal chassis member to be greatly reduced. To further eliminate torquing stresses against the suspension cross member, a modified suspension bracket is also provided to be mounted to several surfaces of the suspension cross member oriented in different planes.

SUMMARY OF THE INVENTION

A suspension assembly for supporting a wheel of a motor vehicle includes a suspension bracket mounted to the base and sides of a suspension cross member; an axle beam having an outboard end to which a spindle is mounted, and an inboard end, opposite the outboard end, mounted to the suspension bracket. A radius arm having a rear end coupled to the more proximate of the two longitudinal chassis members at a point adjacent to the attachment location between the longitudinal chassis member and a center cross member, and a front end coupled to the axle beam adjacent to the spindle and extending approximately perpendicularly from the axle beam. The axle beam thus rotates about a horizontal line longitudinal with the vehicle, at the point of pivotal mounting to the suspension bracket. The torsional angle through which the inboard end of the axle beam moves is reduced from more than twenty-five degrees to about fifteen degrees when the outboard end of the axle beam is raised or lowered by about ten inches. The torquing stresses on the suspension bracket, the axle beam, the radius arm, the longitudinal chassis member, and the suspension cross member are thus decreased by as much as forty percent, vibrations are reduced and a smoother ride is provided.

BRIEF DESCRIPTION OF THE DRAWINGS

The invention will be better understood from the following detailed description taken in conjunction with the accompanying drawings.

DETAILED DESCRIPTION OF THE PREFERRED EMBODIMENT

Figure 1:
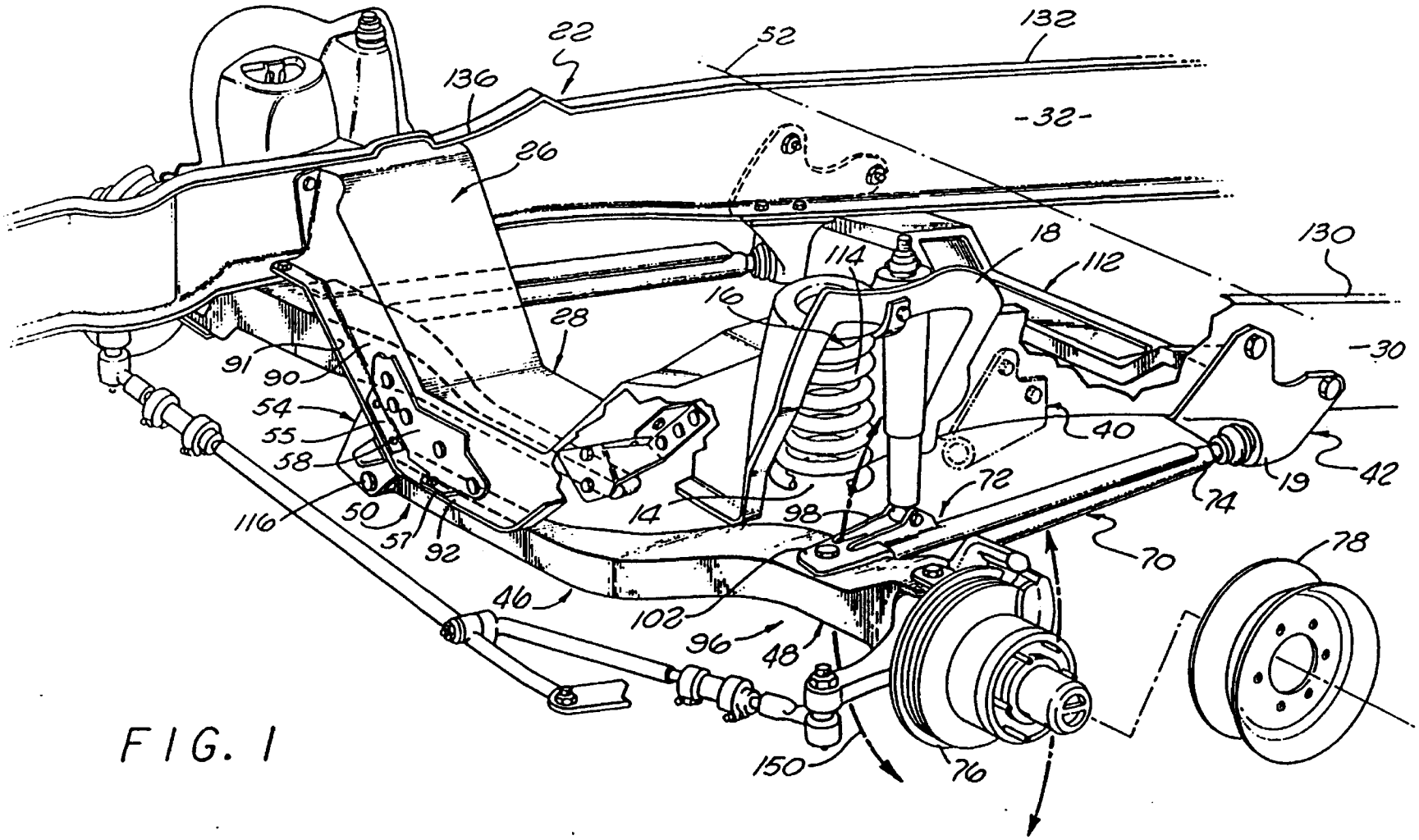
FIG. 1 is a pictorial view of a pair of front suspension assemblies in accordance with the present invention shown with various chassis members.
Figure 4:
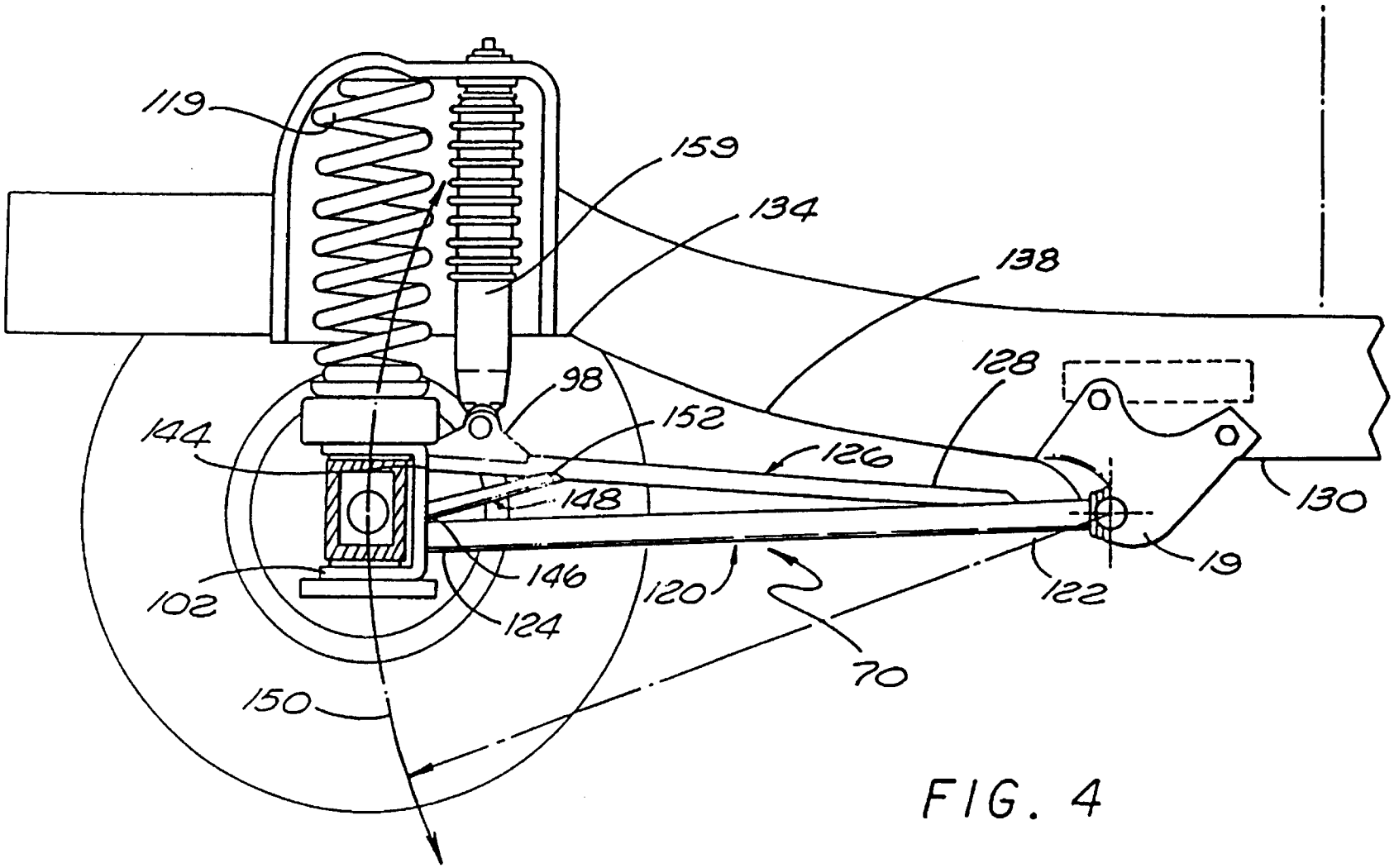
FIG. 4 is a pictorial view of the radius arm of the present invention and one of the longitudinal chassis members.

Referring to FIG. 1 viewed together with FIG. 4, a portion of a vehicle chassis 22 incorporating the suspension assembly of the present invention 96 is shown. The vehicle chassis 22 includes a first longitudinal chassis member 30 and a second longitudinal chassis member 32, a center cross member 112, a midregion of the chassis 52, and a suspension cross member 26, having a downwardly protruding center region 28, with a plurality of attachment surfaces such as surfaces 90, 91 and 92 oriented in different planes. As can be seen more clearly in FIG. 4, each longitudinal chassis member 30 and 32 has a lower center portion, 130 and 132 respectively, nearer the ground; a raised end portion 134 and 136 respectively, and a bend transition portion 138 between the lower center and raised end portion, 130 and 134 respectively, and a bend transition portion, 138 and [140,] between the lower center and raised and portions 132 and 136, and 130 and 134, respectively. The suspension cross member 26 is coupled between the raised end portions 134 and 136 of the longitudinal chassis members 30 and 32, and the center cross member 112 is coupled betWeen the lower center portions 130 and 132 of the longitudinal chassis members 30 and 32, respectively.

A suspension assembly such as suspension assembly 96 of the present invention may be provided for each wheel but is usually provided only for the two front wheels. The suspension assembly 96 includes a radius arm 70 with a rear end 74 and a forward end 72. The rear end 74 of the radius arm 70 is attached to the first longitudinal chassis member 30 at a suspension attachment site 42 at the lower center portion 130 of the first longitudinal chassis member 30 adjacent the center cross member 112 by means of a chassis bracket 19. A shock absorber mount bracket 98 is attached to the radius arm 70 adjacent to the front end 72 of the radius arm 70. Also included is an elongated spring 114 having two ends, a lower end 14, and an upper end 16, the lower end 14 being positioned at the shock absorber mount bracket 98, and the upper end coupled to a spring mounting bracket 18. A radius arm bracket 102 is mounted to the forward end 72 of the radius arm 70 adjacent to the shock absorber mount bracket 98. The radius arm bracket 102 preferably rigidly mounts the radius arm 70 to an axle beam 46.

The axle beam 46 has an outboard end 48 and an inboard end 50. The outboard end 48 of the axle beam 46 is located adjacent to the point at which the radius arm 70 is mounted to the axle beam 46, and is coupled to a spindle 76 to which a wheel 78 of the vehicle is connected. The inboard end 50 of the axle beam 46 is pivotally mounted to a suspension bracket 54. The suspension bracket 54 has a first mounting flange 55, a second mounting flange 58, and a third mounting flange 57. The first mounting flange 55 is mounted to attachment surface 91, the second mounting flange 58 is mounted to attachment surface 90, and the third mounting flange 57 is mounted to attachment surface 92 of the suspension cross member 26 remote from the spindle 76.

Figure 3:
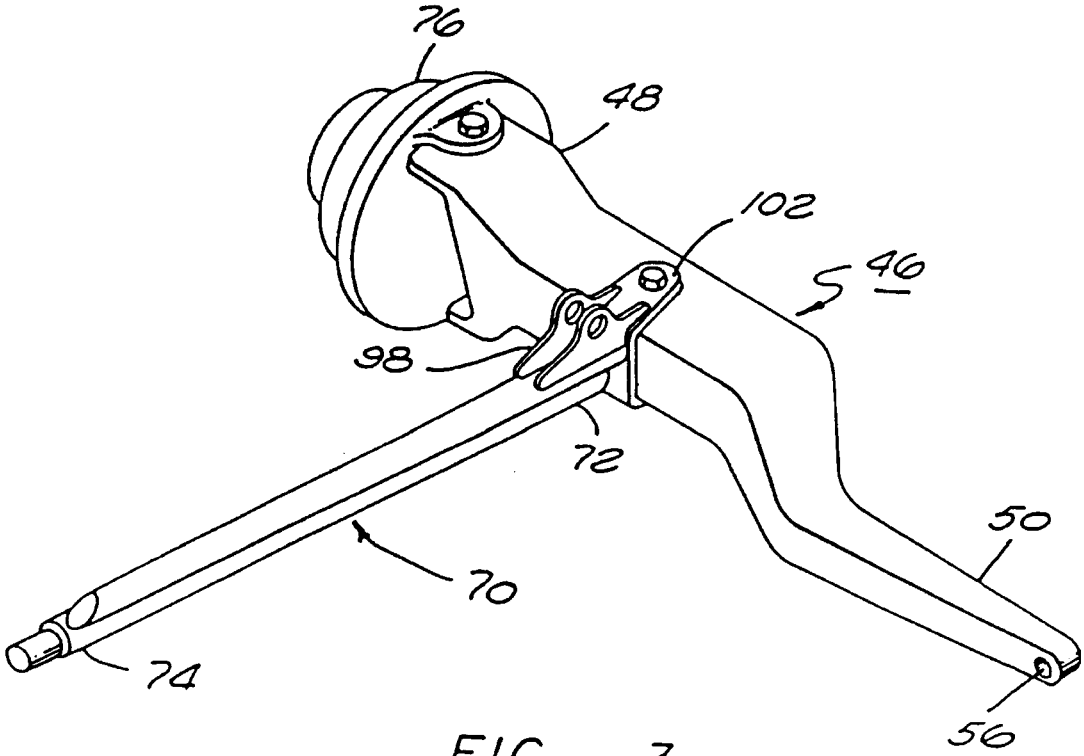
FIG. 3 is a pictorial view of a radius arm and axle beam of the present invention.

When the vehicle is driven over a protruding road hazard, the wheel 78 and the spindle 76 are forced upward. This causes the outboard end 48 of the axle beam 46 to rise. The outboard end 48 of the axle beam 46 maintains a constant distance from the suspension attachment site 42 at the same time as the outboard end 48 of the axle beam 46 moves upwardly. The outboard end 48 of the axle beam 46 consequently travels along an arc 150 defined by the length of the radius arm 70 and the axle beam 46. As the outboard end 48 of the axle beam 46 moves along the arc 150, a torquing of the inboard end 50 of the axle beam 46 occurs. This torquing is transmitted through the suspension bracket 54, and by a suspension bracket connection pin 116 extending through a pin mounting orifice 56 (FIG. 3). The rotation of the axle beam 46 causes stress on the suspension bracket connection pin 116, which in turn is transmitted to the suspension bracket 54 and the suspension cross member 26. Similar stresses are transmitted through the radius arm 70 and the chassis bracket 19 to the first longitudinal chassis member 30. The greater the angle along arc 150 through which travel occurs, the greater the resulting stresses applied to the suspension cross member and the first longitudinal chassis member 30.

Figure 2:
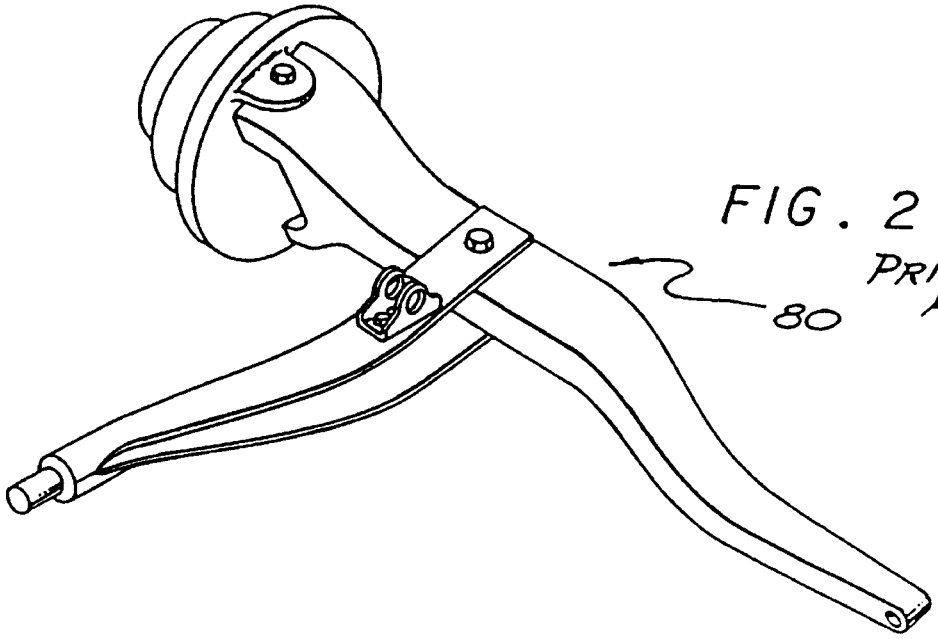
FIG. 2 PRIOR ART
FIG. 2 is a pictorial view of a radius arm and axle beam of a conventional suspension assembly.

Referring to FIG. 2 in connection with FIG. 1, a conventional radius arm 80 is illustrated for affixation to the first longitudinal chassis member 30 (FIG. 1) at a conventional suspension attachment site 40 (FIG. 1) located at a point along the bend transition portion 138 (FIG. 4) of the first longitudinal chassis member 30 (FIG. 1), but spaced from the outboard end 48 (FIG. 1) of the axle beam 46 (FIG. 1). The conventional radius arm 80 is significantly shorter than the radius arm 70 (FIG. 1) of the present invention. This results in a torsion of the pin mounting orifice 56 (FIG. 3) of the axle beam 46 (FIG. 1) against the suspension bracket 54 (FIG. 1) of about twenty-five degrees when the spindle 76 (FIG. 1) is raised or lowered approximately ten inches and causes the stress forces transmitted through the radius arm to be applied against the first longitudinal chassis member 30 (FIG. 1) in a way so that a significant bending component exists resulting in a bending stress force to be applied to the first longitudinal chassis member 30 proportional to the angle subtended by the radius arm. Also, because the length of the radius arm is short, the [accurate] *arcuate* travel is greater resulting in a significantly slower recovery time. This results in a "rough," jarring ride. In addition, forces from wheel and tire impacts with road irregularities and obstructions are transmitted through the conventional radius arm 80 to the first longitudinal chassis member 30 (FIG. 1), in the bend transition portion 138 so that a significant transverse component exists, resulting in a high level of stress being applied to the first longitudinal chassis member 30 (FIG. 1).

FIG. 3 viewed together with FIG. 1 illustrates the coupling of the rear end 74 of the radius arm 70 of the present invention to the first longitudinal chassis member 30 (FIG. 1) by means of the chassis bracket 19 (FIG. 1) at the suspension attachment site 42 (FIG. 1) adjacent to the center cross member 112 (FIG. 1) located near the mid-region of the chassis 52 (FIG. 1) along its horizontal lower center portion 130 (FIG. 4). The increased length of the radius arm 70 thereby limits the subtended angle to about fifteen degrees when the outboard end 48 of the axle beam 46 is raised or lowered about ten inches along the arc 150 (FIG. 1).

This decreased angle allows the vehicle to traverse hazards with reduced stress on the suspension bracket connection pin 116 (FIG. 1), the suspension bracket 54 (FIG. 1), the first longitudinal chassis member 30 (FIG. 1), and the suspension cross member 26 (FIG. 1), and that reduced stress is further dissipated by the placement of the suspension attachment site 42 (FIG. 1) so that forces are transferred longitudinally along the horizontal lower center portion 130 rather than transversely to the bend transition portion 138 on the first longitudinal chassis member 30 (FIG. 1). The above innovations have been found to substantially reduce the occurrence of stress breaks and failures, provide a smoother ride and to decrease vibration.

Additional vertical travel of the spindle 76 (FIG. 1) is made possible by the elongated spring 114 (FIG. 1) which enables the entire suspension assembly 96 (FIG. 1) to be lowered relative to the vehicle chassis 22 (FIG. 1) by about three inches. This additional vertical travel also contributes to a smoother ride by allowing the vehicle to traverse large obstacles before reaching the limits of the suspension's travel.

Referring to FIG. 4, the preferred embodiment of the radius arm 70 includes a lower tube 120 and an upper tube 126. The lower tube 120 has a first end 122 and a second end 124. The first end 122 of the lower tube 120 is mounted to the first longitudinal chassis member 30 (FIG. 1) by means of the chassis bracket 19 (FIG. 1) at the suspension attachment site 42. The second end 124 of the lower tube 120 is mounted to the radius arm bracket 102. The upper tube 126 has a first end 128 and a second end 144. The first end 128 of the upper tube 126 is mounted to the lower tube 120 proximal to the first end 122 of the lower tube 120. The second end 144 of the upper tube 126 is mounted to the radius arm bracket 102 such that the upper tube 126 is angled in relationship to the lower tube 120. The radius arm 70 further includes a gusset tube 148 having a first end 146 and a second end 152, the first end 146 mounted to both the radius arm bracket 102 and the second end 124 of the lower tube 120, and the second end 152 of the gusset tube 148 mounted to the upper tube 126 at a location remote from the radius arm bracket 102. The shock absorber mount bracket 98 is mounted to the radius arm bracket 102 and the second end 144 of the upper tube 126. The shock absorber mount bracket 98 is adapted for mounting to a shock absorber (not shown). The radius arm bracket 102 is adapted for mounting to the axle beam 46 (FIG. 1).

Other embodiments of the invention can be fashioned by those skilled in the art without departing from the spirit of the invention.

What is claimed is:

[1. A suspension assembly for supporting a wheel of a motor vehicle having a chassis comprising a first longitudinal chassis member, a second longitudinal chassis member, each chassis member having a lower center portion, a raised end portion and a bend transition portion between the lower center portion and raised end portion, and a suspension cross member coupled between the raised end portions of the first and second longitudinal chassis members, the first longitudinal chassis member being nearest the wheel and having a suspension attachment site located along the lower center portion of the first longitudinal chassis member, the suspension assembly comprising:

a suspension bracket mounted to the suspension cross member at a location remote from the first longitudinal chassis member;

an axle beam having a outboard end and an inboard end, the inboard end movably mounted to the suspension bracket;

a chassis bracket attached to the first longitudinal chassis member at the suspension attachment site; and and elongated radius arm having a rear end and a forward end, the forward end of the radius arm coupled to the axle beam at a location adjacent to the outboard end of the axle beam and the rear end of the radius arm movable mounted to the chassis bracket.]

[2. The suspension assembly of claim 1, further comprising an elongated spring having a lower and an upper end, the lower end mounted on top of the radius arm adjacent to the forward end of the radius arm, and the upper end of the spring coupled to spring mounting bracket, the spring mounting bracket being coupled to the nearest longitudinal chassis member at a point near the front of the chassis, the elongated spring lowering the wheel relative to the chassis by about three inches.]

[3. The suspension assembly of claim 1 wherein the suspension cross member configures multiple attachment surfaces each oriented in a different plane, and the suspension bracket comprises at least two attachment flanges mounted to different one of the multiple attachment surfaces for rigid attachment of the suspension bracket to the suspension cross member.]

[4. The suspension assembly of claim 1 further comprising a spindle mounted to the outboard end of the axle beam and a wheel rotationally mounted to the spindle.]

[5. An improved suspension assembly for supporting a wheel of a motor vehicle, the vehicle having a chassis comprising a first longitudinal chassis member, a second longitudinal chassis member, each chassis member having a lower center portion, a raised end portion extending over the suspension assembly and a bend transition portion between the raised end portion and lower center portion, and a suspension cross member between the raised end portions of the respective first and second longitudinal chassis members, the first longitudinal chassis member being nearest the wheel and having a first suspension attachment site located along the raised end portion of the first longitudinal chassis member, and a second suspension attachment site rearward of the first suspension attachment site and along the lower center portion of the first longitudinal chassis member, the suspension assembly further comprising:

a first suspension bracket mounted to the suspension cross member;

an axle beam having an outboard end and an inboard end, the inboard end movably mounted to the first suspension bracket, the outboard end having the spindle and the wheel mounted thereon; a first chassis bracket attached to the first longitudinal chassis member at the first suspension attachment site;

a first radius arm having a rear end and a forward end, the forward end of the first radius arm coupled to the axle beam at a location adjacent to the rear end of the axle beam and the rear end of the first radius arm movably mounted to the first chassis bracket; the improvement comprising:

a second chassis bracket mounted to the first longitudinal chassis member at the second suspension site, the second chassis bracket replacing the first chassis bracket; and an elongated second radius arm having a front and an rear end and interconnected at its rear end to the second chassis bracket and at its front end to the axle beam adjacent the outboard end of the axle beam, the elongated second radius arm replacing the first radius arm.]

[6. The improved suspension assembly of claim 5 wherein the suspension cross member has a plurality of attachment surfaces oriented in different planes, the improved suspension assembly further comprising a second suspension bracket having a plurality of attachment flanges, the attachment flanges attached to the attachment surfaces of the suspension cross member for distributing the torquing forces applied to the suspension cross member by the axle beam is response to vertical wheel movement.]

[7. A suspension assembly for supporting a wheel on one side of a motor vehicle, the motor vehicle having a chassis with a first longitudinal chassis member, a second longitudinal chassis member spaced apart from the first longitudinal chassis member, and a suspension cross member coupled between the first and second longitudinal chassis members, the suspension cross member defining a downwardly protruding center region and having an inverted "U" shaped cross section, the inverted "U" shaped cross section defining a base part, two side parts, and two horizontal lip parts, the first longitudinal chassis member containing therealong a mid-region suspension connection point, the suspension assembly comprising:

a suspension bracket mounted to the base part and at least one of the side parts of the suspension cross member at a point proximate to the second longitudinal chassis member, and remote from the first longitudinal chassis member;

an axle beam, having an outboard end and an inboard end, the inboard end movably mounted to the suspension bracket;

a spindle mounted to the outboard end of the axle beam; and a radius arm, having a rear end and a front end, the front end of the radius arm coupled to the axle beam adjacent to the spindle, and the rear end of the radius arm movably coupled to the longitudinal chassis member at the mid-region suspension connection point.]

8. [An apparatus according to claim 7,] *A suspension assembly for supporting a wheel on one side of a motor vehicle, the motor vehicle having a chassis with a first longitudinal chassis member, a second longitudinal chassis member spaced apart from the first longitudinal chassis member, and a suspension cross member coupled between the first and second longitudinal chassis members, the suspension cross member defining a downwardly protruding center region and having an inverted "U" shaped cross section, the inverter "U" shaped cross section defining a base part, two side parts, and two horizontal lip parts, the first longitudinal chassis member containing therealong a mid-region suspension connection point, the suspension assembly comprising:*

*suspension bracket mounted to the base part and at least one of the side parts of the suspension cross member at a point proximate to the second longitudinal chassis member, and remote from the first longitudinal chassis member;*

*an axle beam, having an outboard end and an inboard end, the inboard end movably mounted to the suspension bracket;*

*a spindle mounted to the outboard end of the axle beam; and*

*a radius arm, having a rear end and a front end, the front end of the radius arm coupled to the axle beam adjacent to the spindle, and the rear end of the radius arm movably coupled to the longitudinal chassis member at the mid-region suspension connection point* wherein the radius arm comprises:

a radius arm bracket having a first side remote from the axle beam and a second side adjacent to be the axle beam;

a lower tube, having a first end and a second end, the first end movably coupled to the longitudinal chassis member at the mid-region suspension connection point, and the second end fixed to the first side of the radius arm bracket;

an upper tube, having a first end and a second end, the first end fixed to the lower tube at a point adjacent to the first end of the lower tube, and the second end of the upper tube fixed to the radius arm bracket distant from the lower tube;

a gusset tube having a first end and a second end, the first end fixed to both the second end of the lower tube and to the radius arm bracket, and the second end mounted to the upper tube at a point remote from the radius arm bracket; and a shock absorber mount bracket having an upper end and a lower end, the upper end movably mounted to a shock absorber, and the lower end fixed to the second end of the upper tube.

[9. An apparatus according to claim 7, wherein the downwardly protruding center region and the inverted "U" shaped cross section define a plurality of attachment surfaces oriented in different planes, and the suspension bracket comprises:

a lower portion for receiving a suspension bracket connecting pin;

at least two vertical surfaces for mounting against at least one of the side parts of the inverted "U" shaped cross section of the suspension cross member;

at least two non-vertical surfaces for mounting against the base part of the inverted "U" shaped cross section and an ear of the suspension cross member;

the horizontal surfaces oriented in different planes, and the vertical surfaces oriented in different planes, for mounting against the base part and the side part of the inverted "U" shaped cross section of the suspension cross member; and the suspension bracket thereby dissipating stress caused by the torsion of the axle beam over the base part, two side parts, and an ear of the inverted "U" shaped cross section of the suspension cross member.]

* * * * *

UNITED STATES PATENT AND TRADEMARK OFFICE

CERTIFICATE OF CORRECTION

PATENT NO. : RE 35,168

DATED : March 5, 1996

INVENTOR(S) : William Golpe

It is certified that error appears in the above-indentified patent and that said Letters Patent is hereby corrected as shown below:

Col. 1, line 34, "projection" should be --projecting--

Col. 2, line 16, "side" should be --ride--

Col. 3, line 48, "betWeen" should be --between--

(Fig. 1) of the suspension bracket--

Col. 7, line 57, claim 8, "inverter" should be --inverted--

Col. 7, line 62, claim 8, before "suspension" insert --a--

Col. 8, line 17, claim 8, delete "be"

Signed and Sealed this

Twenty-eighth Day of October, 1997

*Attest:*

Bruce Lehman

BRUCE LEHMAN

*Attesting Officer*

*Commissioner of Patents and Trademarks*